Sept. 13, 1955  W. E. SWIFT ET AL  2,717,516
JUICE MEASURING PNEUMATIC CONTROL SYSTEM
Filed Oct. 27, 1951  2 Sheets-Sheet 1
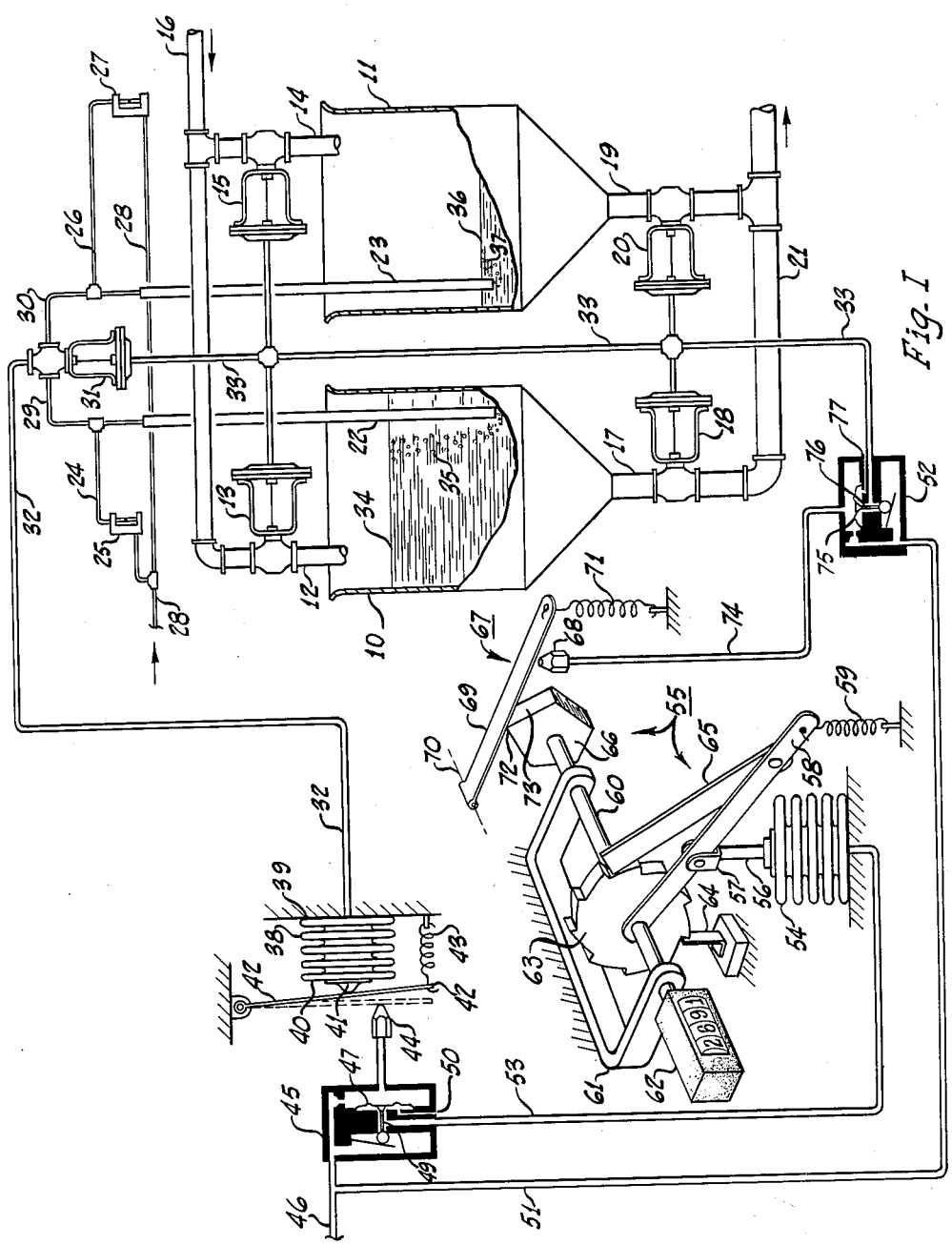
Fig. I
INVENTOR.
W. EVERETT SWIFT
ROBERT K. GARDNER
BY
Curtis, Morris + Safford
ATTORNEYS Sept. 13, 1955 W. E. SWIFT ET AL 2,717,516
JUICE MEASURING PNEUMATIC CONTROL SYSTEM
Filed Oct. 27, 1951 2 Sheets-Sheet 2
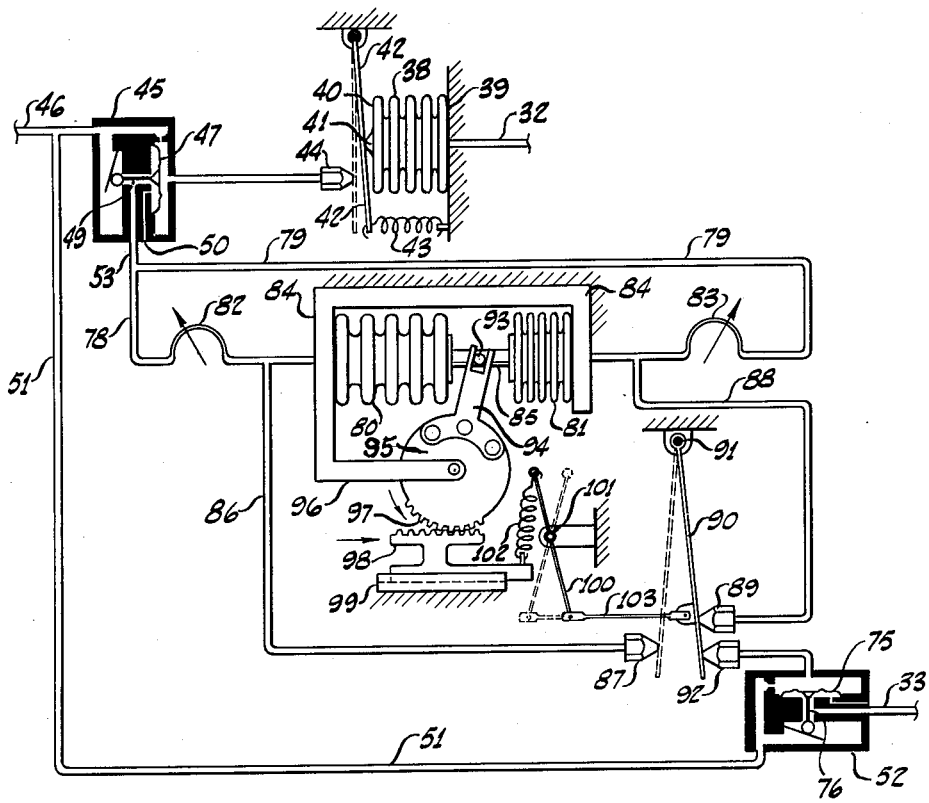
Fig. II
INVENTOR.
W. EVERETT SWIFT
ROBERT K. GARDNER
BY
Curtis, Morris + Safford
ATTORNEYS

United States Patent Office

2,717,516
Patented Sept. 13, 1955

2,717,516

JUICE MEASURING PNEUMATIC CONTROL SYSTEM

Willard Everett Swift, Sharon, and Robert K. Gardner, Fairhaven, Mass., assignors to The Foxboro Company, Foxboro, Mass., a corporation of Massachusetts Application October 27, 1951, Serial No. 253,548

3 Claims. (Cl. 73—220)

This invention relates to a control system for sugar or fruit juice measuring apparatus or the like. It particularly relates to such apparatus wherein a juice measurement representation is obtained in the form of air pressure necessary to bubble air from a tube end located below the surface of a quantity of the juice in a tank of known dimensions.

This invention provides a pneumatic control system for such apparatus. An electrical control system for such juice measuring apparatus has been used in the past, but there have been substantial disadvantages. Electrical switching devices and relays were used, in a comparatively expensive and involved arrangement combined with pneumatic devices. Further, it is usual to operate such apparatus in outlying plantations or remote areas where the available electric power supply produces wide variation in line voltages, causing failure of the magnetic devices used in such electrical control systems.

The pneumatic control system of this invention avoids such disadvantages, since it is simple, inexpensive, and is substantially less susceptible to reduce efficiency in the areas where it is generally used.

The juice measuring apparatus of this type comprises a pair of tanks, one of which is being filled while the other is being drained, with the tanks being filled in alternation.

This invention provides a pneumatic control system which receives a series of pneumatic signals, each signal being a representation that one of the tanks has been filled to the point where it contains a predetermined quantity of juice. The first signal of the series is from one tank, the second signal from the other tank, the third signal is from the first tank again, the fourth signal is from the second tank again, and so on.

The control system of this invention, in response to any one of the signals, causes a change over, from tank to tank, of filling, draining, and signal connections, as will be described hereinafter, so that the tanks are alternated in measuring bodies of juice.

It is accordingly an object of the present invention to provide a juice measuring sequence control system for pneumatically producing alternating tank change over actions in response to a series of unidirectional pneumatic signals.

For this purpose, this invention provides a control system for responding to a series of identical pneumatic signals to produce, in alternation, different pneumatic output conditions.

Other objects and advantages of this invention will be in part obvious and in part pointed out hereinafter. The many objects and advantages of the present invention may best be appreciated by reference to the accompanying drawings, which illustrate a preferred embodiment and an alternative embodiment of the present invention and wherein:

Figure I is a schematic showing of a pneumatic control system for a two tank juice measuring apparatus; and Figure II is a schematic showing of an alternate structure as a substitute for a part of the control system of Figure I.

Referring to Figure I, a pair of juice measuring tanks 10 and 11 are provided. These tanks are vertical cylinders with open tops, and bottom portions tapering conically downwardly and inwardly. Tank 10 is provided with a juice supply pipe 12 extending into the open top thereof and a supply valve 13 mounted on the pipe 12 to control the supply flow therethrough.

In like manner, tank 11 is provided with a juice supply pipe 14 extending into its open top, and a supply valve 15 is mounted on the pipe 14 to control the supply flow therethrough. On the supply side of the valves 13 and 15, a juice supply pipe 16 is connected to both pipes 12 and 14 as a common supply for both pipes.

Tank 10, at the bottom thereof, is connected to a drain pipe 17, and a drain valve 18 is mounted on the pipe 17. Similarly, tank 11 is provided with a drain pipe 19 and a drain valve 20. On the drain side of valves 18 and 20, drain pipes 17 and 19 are connected to a pipe 21 as a drain common to both.

The indication of the quantity of juice in the tanks 10 and 11 is obtained by the "bubble pipe" method, which uses a bubble pipe 22 in tank 10 and a bubble pipe 23 in tank 11. The use of such bubble pipes is illustrated in principle in U. S. Patent 1,822,458 to D. H. Rowland et al. Air is supplied through the pipe 22 to a point near the bottom of the tank, under air pressure sufficient to cause a continuous relatively slow flow of air into the juice in such a manner that bubbles are formed which rise to the surface of the juice. The back pressure in the pipe 22 of the air thus supplied is a measure of the quantity of the juice, considering the dimensions of the tank.

In the embodiment shown, in tank 10, the bubble pipe 22 extends straight down into the tank. Air is introduced into the pipe 22 through an air supply pipe 24, and a ball float air flow indicator 25 is located in the supply pipe 24. This indicator simply shows a ball floating in a tube as an indication of a sufficient air supply for the operation of the device; i. e., to maintain the bubbling action.

In like manner, the bubble pipe 23 is extended into tank 11 and air is introduced thereinto through an air supply pipe 26, with a ball float air flow indicator 27 located in the pipe 26. Both air supply pipes 24 and 26 are connected to a pipe 28, as a common air supply pipe.

In direct connection, respectively, with the bubble pipes 22 and 23, back pressure pipes 29 and 30 are supplied. The pipes 22 and 23 lead the bubble pipe back pressure to a selector valve 31. In accordance with a control pressure applied thereto, which will be explained later herein, this valve 31 selects the bubble pressure tank whose turn it is to be filled, and pneumatically connects the bubble tube associated therewith, through its back pressure tube 29 or 30 to a pipe 32 as an output of the bubble pipe back pressure. The same output pipe 32 is used for both tanks, but in alternation. The bubble pipe of the draining tank is not connected pneumatically to the output pipe 32.

The back pressure in the output pipe 32 is representative of the quantity of juice in the tank which is filling, i. e., the tank whose bubble pipe is connected pneumatically to the output pipe 32 through its back pressure pipe and the selector valve 31. When the desired quantity of juice is reached in the filling tank, the back pressure becomes, by predetermination, sufficient to operate the pneumatic control system, to be described hereinafter, so as to simultaneously drain the filled tank and start filling the empty, or low level tank.

The change over of filling and draining action from one tank to the other is accomplished by the application of pneumatic pressure conditions simultaneously to all the control valves, that is, supply valves 13 and 15, the bubble pipe selector valve 31, and drain valves 18 and 20.

In this illustration there are only two control system output pressure conditions that are used in application to these valves: pressure full on, and pressure full off. It is common usage in the operation of such valves to adjust or arrange the valve, within the valve where it connects with the pipe whose flow it controls, so that it is an "air to open" or "air to close" valve, as desired. "Air to open" simply means the valve is normally closed and that when pneumatic pressure is applied to the valve, it is opened and flow is permitted through the pipe controlled by the valve. "Air to close" is the opposite condition, with the valve normally open, that is, in a pressure full off condition, flow is permitted through the pipe controlled by the valve.

As shown in Figure I, all the valves are supplied with pneumatic control pressure from a sigle control pressure pipe system 33. Whatever pneumatic pressure condition exists in this pipe 33, as the output of the control system of this device, is simultaneously applied to all of the valves. Referring to tank 10, the supply valve 13 is an "air to close" valve and the drain valve 18 is an "air to open" valve. Referring to tank 11, the supply valve 15 is an "air to open" valve, and the drain valve 20 is an "air to close" valve. The bubble pipe selector valve 31 is always open in that it always connects pneumatically one or the other of the bubble pipes 22 and 23 to the output pipe 32. In the "pressure full on" condition of the control pressure, the bubble pipe valve connects the bubble pipe 22 pneumatically with the output pipe 32 and closes off the bubble pipe 23 from that output. In the "pressure full off" condition of the control pressure, the bubble pipe 23 is connected and the bubble pipe 22 is closed off.

Thus, when the control pressure in pipe 33 is full off, as shown in Figure I, the following conditions prevail: in tank 10 the bubble pipe 22 is connected pneumatically to the output pipe 32 through the selector valve 31, the supply valve 13 is open, the drain valve 18 is closed, and the tank is filling with juice; in tank 11 the bubble pipe 23 is closed off from the output pipe 32 by the selector valve 31, the supply valve 15 is closed, the drain valve 20 is open, and the tank is draining.

The tank 10 is shown, Figure I, with a high juice level 34 and a long bubble stream 35, indicating that the tank is near the filled point and the bubble pipe back pressure is increasing and nearing the point where a change over will occur. The tank 11 is shown with a low juice level 36 and a short bubble stream 37, indicating that the tank is near the drained point and the bubble pipe back pressure is small. This small back pressure has no effect anyway, not being connected to the output pipe 32 at this point in the control sequence.

When the tank change has been made, and the control pressure is in the full off condition, the following other conditions prevail: in tank 10 the bubble pipe 22 is closed off from the output pipe 32 by the selector valve 31, the supply valve 13 is closed, the drain valve 18 is open, and the tank is draining; in tank 11 the bubble pipe 23 is connected pneumatically to the output pipe 32 by the selector valve 31, the supply valve 15 is open, the drain valve 20 is closed, and the tank is filling.

The remainder of Figure I is structure which produces, from the initiating action of bubble pipe back pressure in the output pipe 32, pressure full on and pressure full off conditions in the valve connected control pressure pipe 33.

When a tank is being filled with juice, the bubble pipe back pressure in the output pipe 32 is increasing as the juice head increases above the lower end of the bubble pipe. When the tank is filled to a desired, predetermined extent, this back pressure reaches a value sufficient to produce an operational step in the pneumatic control system. This build up of pressure may be considered as a single pneumatic pulse or signal, and a series of such pulses, as the tanks fill in alternation, may be considered as a series of unidirectional pneumatic signals. The word unidirectional is used in the sense that only the application of the signal has any effect on the control system output pressure in the control pressure pipe 33. The withdrawal of the signal has no effect on the control system output pressure.

Thus the pneumatic signals in the bubble pressure output pipe 32 are applied step by step, i. e., tank filling by tank filling, in the pneumatic control system as a series of condition values. A tank filled to a predetermined extent provides such a condition value.

In the arrangement and operation of the pneumatic control system, the output pipe 32 is connected to a bellows 38. This bellows has a fixed end 39, and a movable end 40, this end being movable upon the application of the bubble pipe back pressure to the interior of the bellows through the pipe 32. On the outer face of the movable end of the bellows 38, a mechanical contact button 41 is provided for engagement with a pivoted baffle arm 42, biased against the bellows by a spring 43. As the bubble pipe back pressure expands the bellows 38, the baffle 42 is moved into restrictive association with a pneumatic nozzle 44, which has a small pneumatic flow therethrough. The nozzle 44 is connected to a pneumatic relay 45. This is a relay for supplying pneumatic power in response to a small tripping pressure supplied by back pressure as the flow through nozzle 44 is restricted by the baffle 42. A pneumatic flow is passed through the relay in restriction from a pneumatic power supply pipe 46, to supply the small flow through the nozzle 44.

The nozzle back pressure is applied to a diaphragm 47 in the relay 45. The relay is supplied with pneumatic pressure from the supply pipe 46, and the diaphragm 47 operates a supply and waste valve mechanism 49 to provide an output pressure from the relay or to exhaust from an outlet 50 to atmosphere.

Pipe 51 from the pneumatic power suply pipe 46 is a power conduit to another relay, at 52, which is operated later in the control sequence.

Pipe 53, from the output of relay 45, is connected with a second bellows 54, with one end fixed and one end movable, for the expansion of that bellows in response to pneumatic signals from the relay 45. The movement of bellows 54 provides actuation for a signal selector assembly, generally indicated at 55, which is a form of pneumatic switch.

The bellows 54 is provided with a rod 56 secured to the movable end of the bellows and extending axially with respect to the bellows. The outer end of the rod 56 is formed as a clevis 57 in which a lever 58 is pivoted. One end of the lever is biased toward the bellows 56 by a spring 59 and the other end is pivoted on a rotatable ratchet shaft 60, supported in a bracket 61. At one end of the shaft 60, a counter 62 is mounted to count step by step rotational movements of the shaft 60. This counter not only gives an indication of how many times the tanks have been filled, but also, by reference to whether the number is odd or even, gives an indication of which tank is being filled. A ten tooth ratchet wheel 63 is secured to the shaft 60 with a ratchet 64. This stop is sufficiently flexible to be sprung past each ratchet tooth as the wheel is stepped around, and it will hold the wheel in place between the stepping movements. A ratchet lever 65 has one end in operative engagement with the wheel 63 and the other end pivoted on the lever 58 between the clevis 57 and the spring 59. This apparatus is so arranged as to provide one ratchet step of rotary movement for each movement of bellows 54 in representation of one tank filled with juice.

On the ratchet shaft 60, at the opposite end with respect to the counter 62, a pentagonal cam 66 is mounted for concentric rotation with the shaft 60. Associated with the cam 66 is a pneumatic nozzle-baffle assembly 67, comprising a nozzle 68 and a baffle 69, the baffle being pivotally supported as at 70 and biased against the pentagonal contour of the cam by a spring 71. Rotation of the cam 66 moves the baffle 69 toward and away from the nozzle 68. As the baffle rests on a corner 72 of the cam 66, the baffle 69 is separated from the nozzle 68, allowing pneumatic flow therethrough. As the baffle rests on a flat portion of the cam, at 73, for example, the baffle is close to the nozzle 68, restricting the pneumatic flow therethrough.

The arrangement of this ratchet and nozzle-baffle device is such that as one tank is filled with juice, the pneumatic pulse or signal therefrom rotates the cam 66 an amount sufficient to move the baffle 69 from a position on a corner, or height of the cam, to a position on the next adjacent flat, low portion of the cam. When the other tank is filled, the cam is moved one more rotary step, from the cam flat to the next adjacent cam height. Thus the nozzle 68 is unrestricted while one tank is filling, and restricted while the other tank is filling.

The nozzle 68 is connected, through a pipe 74, to the relay 52 previously mentioned as being connected to pneumatic power supply pipe 46 through pipe 51. The relay 52 is like the previously described relay 45. It is a relay for supplying pneumatic power in response to a small tripping pressure supplied by back pressure as the flow through the nozzle 68 is restricted by the baffle 69. A pneumatic flow is passed through the relay in restriction from the pneumatic power supply pipe 51, to supply the nozzle 68 with a small pneumatic flow. Back pressure from the nozzle 68 is applied to a diaphragm 75 in the relay 52, and the diaphragm operates a supply and waste valve mechanism 76 to provide an output pressure from the relay or to exhaust from an outlet 77 to atmosphere.

The effect of the pneumatic condition of the output of the relay 52, i. e., the pressure in the pipe 33, has been discussed previously herein. The change over of tanks is accomplished by changing this output condition. The "pressure full on" condition occurs when the nozzle 68 is restricted by the baffle 69. The "pressure full off" condition occurs when the nozzle 68 is essentially not restricted, as shown in Figure I. As the tank change over is made, and a different bubble pipe, 22 or 23, is connected pneumatically to the bellows 38, the newly connected bubble pipe is in a tank where the juice level is low, and the bubble pipe back pressure is small. Thus the pressure in bellows 38 is reduced and the bellows 38 and the baffle 42 are reset in preparation for receiving a new pneumatic pressure from the tank now to be filled.

By proper selection and arrangement, with respect to the tank valves and the ratchet and cam mechanism, the ratchet relation may be other than the two to one, or ten to five as shown, if desired. Also the pneumatic output condition of the relay 52 may be other than simply on and off. It may be in varying degrees of positive pressure, and there may be several conditions instead of simply two.

Referring to Figure II, a structure is illustrated which may be substituted for the ratchet arrangement of Figure I. At the top of Figure II the bubble pressure output pipe 32 is shown, leading to the bellows 38, with the nozzle-baffle and pneumatic relay structure and operation the same as that of Figure I. At the relay output pipe 53 the new structure is shown. Two pneumatic pressure pipes 78 and 79 are connected to the relay output pipe 53. Each of these pipes leads to a different bellows, 80 and 81 respectively, and each pipe has a variable pneumatic restrictor therein, as at 82 and 83. The two bellows are in assembly, axially aligned, with fixed ends mounted on a support 84 and movable ends facing each other, joined by a connection bar 85. In the operation of this device, as will be seen, one or the other of the bellows is expanded in response to the output pressure from the relay 45, and the connection bar 85 is, consequently, moved axially to the right or to the left.

As will be described hereinafter, a multiple nozzle, single baffle pneumatic arrangement is associated with the bellows 80 and 81, and a mechanical connection between the baffle and the movable bellows connecting bar 85 is provided.

Leading from the bellows 80 is a pipe 86, connected to the pipe 78 between the restrictor 82 and the bellows 80. This pipe 86 leads to a pneumatic flow nozzle 87. Leading from the bellows 81 is a pipe 88, connected to the pipe 79 between the restrictor 83 and the bellows 81. This pipe 88 leads to a second nozzle 89. These nozzles face each other, with a baffle 90 swingable therebetween about a pivot 91. The baffle 90 may be moved to cover nozzle 89, as shown, and open nozzle 87, or the reverse. On the same side of the baffle 90 as the nozzle 89, a third nozzle 92 is provided, set back a trifle, since it is radially more distant from the baffle pivot 91 than the nozzle 89 so that the same position of the baffle 90 will close both nozzles 89 and 92. Nozzle 92 is the counterpart of nozzle 68 in Figure I and is connected to relay 52 as in Figure I. Restricting and relieving nozzle 92 has the same effect on the tank valves as has been described with respect to Figure I and the nozzle 68. That is, a tank change over is accomplished by changing the output pressure condition of relay 52.

In this structure of Figure II, as before, the same series of unidirectional pneumatic signals is provided from the tanks, that is, the bubble pipe back pressures, with one signal as each tank is filled. The combination of the bellows and the multiple nozzle-single baffle arrangement alternately provides, for the relay 52, a "pressure on" and a "pressure off" output condition. This is accomplished by covering and uncovering output nozzle 92 with the baffle 90. The baffle 90 is moved by a "flip-flop" mechanism connected to the bellows connection bar 85. Centrally of the bar 85, pin 93 is provided, and a yoke member 94 is mounted to receive the pin 93 and to be moved thereby. The yoke member 94 is mounted on a gear member 95 which in turn is mounted, for rotary movement, on an extension 96 of the bellows support 84. The gear member is provided with gear teeth 97, on its lower portion only, for about a third of its perimeter. Operatively engaging the pinion-like gear 95, is a rack 98 mounted in a channelled support 99 for lateral movement, parallel to the movement of the bellows connecting bar 85.

Laterally adjacent the rack 98 is a "flip-flop" arm 100, pivoted at 101 and connected to the rack by a spring 102 from the upper end of the arm 100 to the rack. The lower end of the "flip-flop" arm, below the pivot 101, is connected to the baffle 90 by a rigid bar 103, with the bar ends in pivoted connections to allow the arm 100 and the baffle 90 to move freely together.

The operation of the arrangement of Figure II is as follows: As a pneumatic signal is produced in the output of relay 45, it "looks" at both avenues of travel offered by pipes 78 and 79. Finding, as in the drawing, the avenue of pipe 79 closed by the baffle 90 restricting the nozzle 89, the signal pressure enters the now constricted bellows 81. In the other avenue, the unrestricted nozzle 87 prevents pressure build up from remaining in or being renewed in bellows 80. The expansion of bellows 81 moves the connection bar 85 to the left and rotates the gear 95 counterclockwise. The rack 98 is moved to the right and the "flip-flop" arm 100 is pivoted clockwise past a vertical position so that the spring 102 snaps it down on the other side of the vertical to move the baffle 90 to the left to uncover nozzles 89 and 92 and to cover nozzle 87. This action changes the relay 52 output from a "pressure on" condition to a "pressure off" condition. Thereafter, when the newly connected tank is filled, the above action is reversed.

In the bellows pipes 78 and 79, the variable restrictors 82 and 83 are used to delay the bellows action sufficiently to prevent undesirable pneumatic cycling.

This invention thus provides a new and improved pneumatic control system with a pneumatic selector switch having unidirectional pneumatic pulse input, and a new, improved, and pneumatic, liquid measuring system.

We claim:

1. For use in fluid measuring apparatus wherein fluid tanks are filled alternately and the quantity of fluid is determined from the number of times the tanks are filled; an automatic pneumatic and mechanical switching system comprising, in combination, a bubble tube arrangement operatively associated with said tanks for producing a series of sequential pneumatic signals of essentially equal value corresponding to a series of predetermined fluid quantity values with each signal corresponding to one filling of a tank, a first pneumatic nozzle-baffle-relay unit responsive to the output of said bubble tube arrangement and operable thereby repeatedly in one direction to repeatedly decrease pneumatic flow from said first nozzle, each of said bubble tube signals producing one such flow decrease and the output of said first nozzle-baffle-relay unit comprising a series of sequential pneumatic signals of essentially equal value, a bellows unit constructed to produce repeated bellows movements in response to said output of said first nozzle-baffle-relay unit, each of said bubble tube signals corresponding to one such bellows movement, a mechanical stepping arrangement movable step-by-step in response to said bellows movements, a second nozzle-baffle-relay unit operable alternately in opposite sense by said stepping unit movements to alternately increase and decrease pneumatic flow from said second nozzle in fixed, predetermined sequential steps to produce an output in the form of a series of alternating value pneumatic signals, said alternating signal series duplicating said bubble tube signal series with respect to the number and timing of the signals, and a pneumatically operated valve arrangement in operative association with said tanks and said bubble tube arrangement, said valve arrangement comprising means for switching the operation of said bubble tube arrangement from one tank to another and means for switching, with respect to each of said tanks, from draining to filling and from filling to draining condition and pneumatic connection means connecting the output of said second nozzle-baffle-relay unit to said valve arrangement to cause the output of said second nozzle-baffle-relay unit to operate said valve arrangement.

2. For use in fluid measuring apparatus wherein fluid tanks are filled alternately and the quantity of fluid is determined from the number of times the tanks are filled; an automatic pneumatic and mechanical switching system comprising, in combination, a bubble tube arrangement operatively associated with said tanks for producing a series of sequential pneumatic signals of essentially equal value corresponding respectively with a series of predetermined fluid quantity values, each signal being representative of one filling of a tank, a first pneumatic nozzle-baffle-relay unit responsive to the output of said bubble tube arrangement and operable thereby repeatedly in one direction to repeatedly decrease pneumatic flow from said first nozzle, each of said bubble tube signals producing one such flow decrease and the output of said first nozzle-baffle-relay unit comprising a series of sequential pneumatic signals of equal value, a bellows unit constructed to produce repeated bellows movements in response to said output of said first nozzle-baffle-relay unit, each of said bubble tube signals corresponding to one such bellows movement, a mechanical stepping arrangement movable step-by-step in response to said bellows movements, said stepping arrangement including a ratchet operable by said bellows unit and a polygonal cam rotatable by said ratchet, a second nozzle-baffle-relay unit operable alternately in opposite sense by said cam to alternately increase and decrease pneumatic flow from said second nozzle in fixed, predetermined sequential steps to produce an output in the form of a series of alternating value pneumatic signals, said alternating signal series duplicating said bubble tube signal series with respect to the number and timing of the signals, and a pneumatically operated valve arrangement in operative association with said tanks and said bubble tube arrangement, said valve arrangement comprising means for switching the operation of said bubble tube arrangement from one tank to another and means for switching, with respect to each of said tanks, from draining to filling and from filling to draining condition, and pneumatic connection means connecting the output of said second nozzle-baffle-relay unit to said valve arrangement to cause the output of said second nozzle-baffle-relay unit to operate said valve arrangement.

3. For use in fluid measuring apparatus wherein fluid tanks are filled alternately and the quantity of fluid is determined from the number of times the tanks are filled; an automatic pneumatic and mechanical switching system comprising, in combination, a bubble tube arrangement operatively associated with said tanks for producing a series of sequential pneumatic signals of essentially equal value corresponding respectively to a series of predetermined fluid quantity values each signal being representative of one filling of a tank, a first pneumatic nozzle-baffle-relay unit responsive to the output of said bubble tube arrangement and operable thereby repeatedly in one direction to reepatedly decrease pneumatic flow from said first nozzle, each of said bubble tube signals producing one such flow decrease and the output of said first nozzle-baffle-relay unit comprising a series of sequential pneumatic signals of essentially equal value, a bellows unit constructed to produce repeated bellows movement in response to said output of said first nozzle-baffle-relay unit, each of said bubble tube signals being represented by one such bellows movement, said bellows unit including a pair of opposed bellows responsive alternately to the output of said first nozzle-baffle-relay unit, a mechanical flip-flop stepping arrangement movable step-by-step in response to said bellows movements, said stepping arrangement including a rack and pinion assembly operable to move said rack reciprocably in accordance with said movements of said bellows, a pivoted flip-flop arm disposed transversely of and adjacent to one end of said rack and a coil spring with one end secured to said rack and one end secured to said flip-flop arm, a second nozzle-baffle-relay unit operable alternately in opposite sense by said flip-flop arm to alternately increase and decrease pneumatic flow from said second nozzle in fixed, predetermined sequential steps to produce an output in the form of a series of alternating value pneumatic signals, said alternating signal series duplicating said bubble tube signal series with respect to the number and timing of the signals, and a pneumatically operated valve arrangement in operative association with said tanks and said bubble tube arrangement, said valve arrangement comprising means for switching the operation of said bubble tube arrangement from one tank to another, and means for switching, with respect to each of said tanks, from draining to filling and from filling to draining condition, and pneumatic connection means connecting the output of said second nozzle-baffle-relay unit to said valve arrangement to cause the output of said second nozzle-baffle-relay unit to operate said valve arrangement.

References Cited in the file of this patent

UNITED STATES PATENTS

| | | |
|---|---|---|
| 1,822,458 | Rowland | Sept. 8, 1931 |
| 1,906,177 | Porte | Apr. 25, 1933 |
| 2,061,917 | Muller | Nov. 24, 1936 |
| 2,285,540 | Stein | June 9, 1942 |
| 2,398,958 | Pellettere | Apr. 23, 1946 |
| 2,399,938 | Pett | May 7, 1946 |
| 2,441,044 | Tate | May 4, 1948 |
| 2,475,630 | Melas et al. | July 12, 1949 |
| 2,593,765 | Keefer | Apr. 22, 1952 |
| 2,641,280 | Fleischhauer | June 6, 1953 |